US008818867B2

(12) United States Patent
Baldwin et al.

(10) Patent No.: US 8,818,867 B2
(45) Date of Patent: Aug. 26, 2014

(54) SECURITY TOKEN FOR MOBILE NEAR FIELD COMMUNICATION TRANSACTIONS

(75) Inventors: Christopher F. Baldwin, Crystal Lake, IL (US); Bruce Barnes, Pingree Grove, IL (US); Patrick J. Kenny, Barrington, IL (US); Shadi I. Khoshaba, Skokie, IL (US); Dolores J. Mallian, St. Charles, IL (US); Nikhil S. Marathe, Roselle, IL (US); Charles M. Stahulak, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/295,455

(22) Filed: Nov. 14, 2011

(65) Prior Publication Data

US 2013/0124346 A1    May 16, 2013

(51) Int. Cl.
*G06Q 20/00* (2012.01)
*G06Q 20/32* (2012.01)

(52) U.S. Cl.
CPC .................................. *G06Q 20/3278* (2013.01)
USPC .......................................................... 705/16

(58) Field of Classification Search
CPC ................................................. G06Q 20/3278
USPC ............................................................ 705/16
See application file for complete search history.

(56) References Cited

U.S. PATENT DOCUMENTS

| 7,213,766 | B2 | 5/2007 | Ryan | |
|---|---|---|---|---|
| 7,873,540 | B2 | 1/2011 | Arumugam | |
| 7,942,337 | B2 * | 5/2011 | Jain | 235/492 |
| 7,961,101 | B2 | 6/2011 | Narendra | |
| 2007/0123305 | A1 | 5/2007 | Chen | |
| 2007/0145152 | A1 | 6/2007 | Jogand-Coulomb | |
| 2008/0103984 | A1 * | 5/2008 | Choe et al. | 705/76 |
| 2008/0245851 | A1 | 10/2008 | Kowalski | |
| 2009/0026277 | A1 | 1/2009 | Phillips | |
| 2009/0124234 | A1 * | 5/2009 | Fisher et al. | 455/406 |
| 2009/0143104 | A1 | 6/2009 | Loh | |
| 2009/0241186 | A1 | 9/2009 | Naniyat | |
| 2010/0009627 | A1 | 1/2010 | Huomo | |
| 2010/0161403 | A1 * | 6/2010 | Fisher et al. | 705/14.38 |
| 2010/0181377 | A1 | 7/2010 | Chen | |
| 2011/0218907 | A1 * | 9/2011 | Dessert et al. | 705/39 |

(Continued)

OTHER PUBLICATIONS

SCM microsystems presents new dongle for multiple NFC applications. (Apr. 3, 2008). PR Newswire. Retrieved from http://search.proquest.com/docview/448676564?accountid=14753.*

(Continued)

*Primary Examiner* — Scott Zare
(74) *Attorney, Agent, or Firm* — Hartman & Citrin LLC

(57) ABSTRACT

Devices, systems, and methods are disclosed which relate to an NFC-enabled security token that is removably coupled to a mobile device. The security token may be provisioned with the information by the mobile device, then decoupled from the mobile device and used to authenticate the user or perform a transaction at a POS terminal equipped with an NFC reader. The security token includes logic for user-controlled restrictions on allowable purchases, such as payment limits, timeouts, vendor identifiers, allowed purchases, and location-based restrictions. The security token is further equipped with "self destruct" security features, such as deactivating itself or erasing any sensitive information upon being unable to contact the mobile device for a specified duration, or being subject to an unauthorized or restricted transaction, until such time as it is re-coupled to the mobile device.

20 Claims, 9 Drawing Sheets

(56) References Cited

U.S. PATENT DOCUMENTS

| | | | |
|---|---|---|---|
| 2012/0221475 A1* | 8/2012 | Grigg et al. | 705/67 |
| 2013/0095755 A1* | 4/2013 | Moreton et al. | 455/41.1 |
| 2013/0095810 A1* | 4/2013 | Moreton et al. | 455/418 |
| 2013/0097079 A1* | 4/2013 | Bruder | 705/44 |
| 2014/0074698 A1* | 3/2014 | Poole et al. | 705/39 |

OTHER PUBLICATIONS

Mobile88.com, "Nokia 6216 Classic Preview," http://www.mobile88.com/cellphone/Nokia/Nokia-6216-Classic/preview.asp (no date available), retrieved from http://www.mobile88.com/cellphone/Nokia/Nokia-6216-Classic/ on Dec. 18, 2013.

S. Manimaraa, "Nokia 6216 classic: First Replacement for Credit Card: NFC Device," pspezone.com, Apr. 25, 2009, retrieved from http://www.pspezone.com/uncategorized/nokia-6216-classic-first-replacement-for-credit-card-nfc-device/ on Dec. 18, 2013.

Claire Swedberg, "MicroSD Card Brings NFC to Phones for Credit Card Companies, Banks," RFID Journal, Nov. 25, 2009, retrieved from http://www.wiseupjournal.com/?p=1272 on Dec. 18, 2013.

Oberthur Technologies, "Providing an innovative, customizable and convenient means of payment to meet the growing demand of consumers in the U.S. and abroad," Aug. 3, 2010, http://www.oberthurcs.com/press_page.aspx?Id=238, retrieved from http://www.businesswire.com/news/home/20100803006528/en/Oberthur-Technologies-Leads-Contactless-Sticker-Revolution on Dec. 18, 2013.

Vivo Tech, "ViVOtag Sticker Technology Increases Customer Loyalty, Usage and Redemption of Promotions and Wallet Share of Payment Cards," Nov. 26, 2011, http://www.vivotech.com/products/vivo_card/vivo_tag.asp, retrieved from http://www.hotfrog.com/Companies/ViVO_14515875/ViVOtech-Products-Contactless-Cards-774191 on Dec. 18, 2013.

* cited by examiner

SECURITY TOKEN FOR MOBILE NEAR FIELD COMMUNICATION TRANSACTIONS

BACKGROUND OF THE SUBJECT DISCLOSURE

1. Field of the Subject Disclosure

The subject disclosure relates to mobile transactions. More specifically, the subject disclosure relates to security tokens for mobile near field communication (NFC) transactions.

2. Background of the Subject Disclosure

The dominant form of electronic payment today is a magnetic stripe credit card. With these types of cards, the purchaser or the merchant swipes the magnetic stripe containing account and other information through a reader coupled to a point-of-sale (POS) terminal. This information is sent by the POS terminal to a server via terrestrial networks, the server including a payment processor that represents the bank that issued the payment product. The payment processor ensures that the credit card is an authorized card and that there is either sufficient money in the bank account or a sufficient credit line to support the transaction. The payment processor then returns an authorization code back through the terrestrial networks to the merchant systems to either approve or decline the transaction.

Electronic payments are slowly migrating from the magnetic stripe to a contactless or near-field-communication (NFC) transaction. As these types of transactions gain popularity, this process has its inconveniences for a user. Particularly, not all users prefer NFC payments to handing over a credit card. Even for mobile devices equipped with NFC chips, issues of security, privacy, and accessibility arise when the mobile device has to be handed over, or otherwise separated from the user, in order to perform the transaction. This is especially risky in situations where the mobile device is a smart phone that contains sensitive information, such as personal information and financial data. Other situations may be conceived of where completing a transaction requires a user to compromise their security, privacy, or even their safety by relinquishing their mobile device to a stranger.

SUMMARY OF THE SUBJECT DISCLOSURE

The subject disclosure presents an NFC-enabled security token that may be removably coupled to a mobile device. In one example embodiment, the subject disclosure is a security token for near-field communication (NFC) transactions. The security token includes an NFC transceiver, a memory in communication with the NFC transceiver, the memory storing transaction information, and logic on the memory for communicating the transaction information to a point-of-sale (POS) terminal based on a determination that no restriction is present. The NFC transceiver, the memory, and the logic are enclosed in a housing adapted to be removably coupled to a mobile device.

In another example embodiment, the subject disclosure may be a mobile device for near-field communication (NFC) transactions. The mobile communication device includes a mobile processor, a mobile memory in communication with the mobile processor, and a security token in communication with the mobile processor via an interface that may be wired or wireless. The security token includes an NFC transceiver, a token memory having transaction information stored therein, and a token logic on the token memory, the token logic for enabling a point-of-sale (POS) terminal to access the transaction information based on a determination that no restriction is present. Logic on the mobile memory programs the transaction information and the restriction on the security token. The security token is removably coupled to a housing of the mobile device In yet another example embodiment, the subject disclosure may be a method for facilitating a near-field communication (NFC) transaction using a security token removably coupled to a mobile device. The method includes receiving transaction information and a restriction at the security token, and transmitting the transaction information to a point-of-sale (POS) terminal upon a determination that the restriction is not triggered.

DETAILED DESCRIPTION OF THE SUBJECT DISCLOSURE

The subject disclosure presents NFC-enabled security tokens that are removably coupled to a mobile device. The security token may be provisioned with the information by the mobile device, then decoupled from the mobile device and used to authenticate the user or perform a transaction at a POS terminal equipped with an NFC reader. The security token may include logic for user-controlled restrictions on allowable purchases, such as payment limits, timeouts, vendor identifiers, allowed purchases, and location-based restrictions. The security token may further communicate its status to the mobile device including transaction approvals, and/or reports. A network server may be invoked to approve the transaction. Information stored on the network server may include certain pre-set limitations, such as those described above, such as a maximum transaction amount, specific items purchased, and/or a set of standard or custom item tags representing categories of purchases. The security token may be further equipped with "self destruct" security features, such as deactivating itself or erasing any sensitive information upon being unable to contact the mobile device for a specified duration, or being subject to an unauthorized or restricted transaction (such as being moved beyond a geo-fence), until such time as it is re-coupled to the mobile device.

Figure 1:
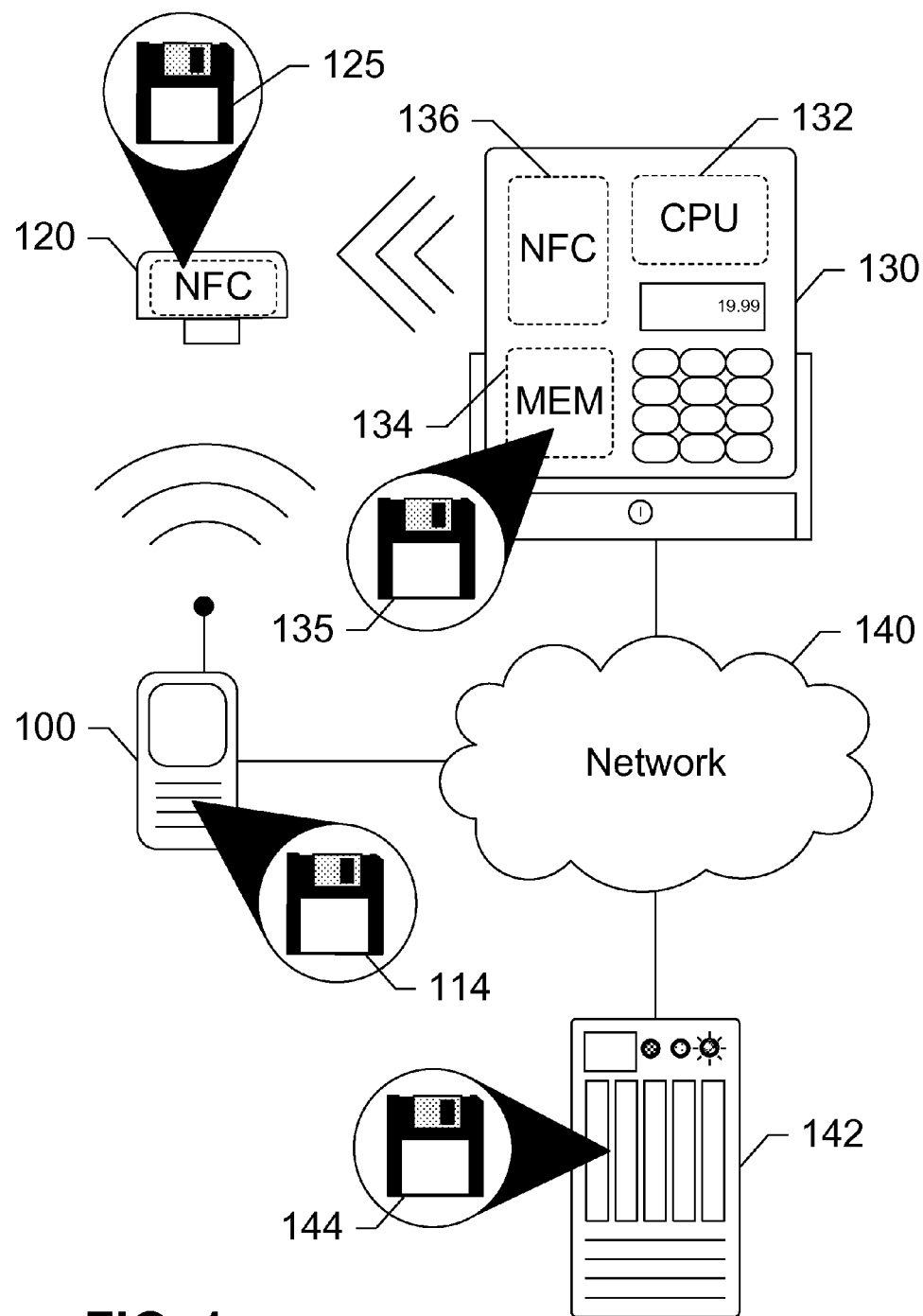
FIG. 1 shows a system for NFC transactions, according to an example embodiment of the subject disclosure.

FIG. 1 shows a system for NFC transactions, according to an example embodiment of the subject disclosure. NFC may generally include any personal-area network communications/broadcast mechanism, such as a point-to-point wireless communication protocol, BLUETOOTH, ZIGBEE, etc. The system may include a mobile device 100 having logic 114 stored therein and an NFC security token 120 having logic 125 stored therein. Security token 120 may also include an NFC tag or chip, such as those used in credit cards, kiosks, museum exhibits, passports, etc., and may further include RFIDs as well as smartcards, universal integrated circuit cards (UICC), etc. A memory and a controller (or processor) may be included within security token 120. NFC security token 120 is shown as being decoupled from mobile device 100, while maintaining wireless communication with mobile device 100. However, other embodiments do not necessarily include any communication between security token 120 and mobile device 100, once decoupled. Further, a POS terminal 130 may also communicate via NFC with security token 120. POS terminal 130 may include any combination of a processor, such as a CPU 132, and a memory 134 having logic 135 stored therein, as well as an NFC reader 136. The POS terminal generally refers to any device that is used to conduct a transaction, including, but not limited to, cash registers, kiosks, subway turnstiles, security barriers, or any other device used to authenticate a user and/or receive a payment. Many modern POS terminals include processors, memory, and are in many ways simply computers with software for conducting transactions. NFC reader 136 may be used to read information from and write to NFC chips, such as that within security token 120. Both mobile device 100 and POS terminal 130 may be further equipped with the appropriate hardware and logic required to connect to a broadband network 140, such as the Internet. Software is one example of such logic. Logic may also include digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

In the present example embodiment, network 140 provides access to a server 142, having logic 144 stored therein. Network 140 may include broadband wide-area networks, such as cellular networks, local-area networks (LAN), and personal area networks, such as near-field communication (NFC) networks including BLUETOOTH®, or any combination thereof. Communication across a network may be generally packet-based; however, radio and frequency/amplitude modulations networks can enable communication between mobile devices using appropriate analog-digital-analog converters and other elements. Communication may be enabled by hardware elements called transceivers. Mobile devices, POS servers, etc. may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A network typically includes a plurality of elements that host logic for performing tasks on the network.

In operation, a user of mobile device 100 may decide to perform a transaction with an operator of POS terminal 130. The transaction may be an authentication or a payment. In other words, POS terminal 130 may either be a security barrier protecting a secure item/area, or a payment terminal at, for instance, a retail outlet. In either case, while security token 120 is still coupled to mobile device 100, the user commands logic 114 on mobile device 100 to provision identifying and/or transaction credentials/information onto security token 120. The transaction information includes, but is not limited to, personal identification information, and payment information such as a credit card number/expiration/security code, bank account information, PAYPAL ID, etc. The user may then decouple security token 120 from mobile device 100. This activates logic 125 on security token 120, enabling it to be used to perform the transaction. Next, the security token 120 may be brought into close proximity with POS terminal 130. This action may include a "swipe" of security token 120 with NFC reader 136 of POS terminal 130. Logic 135 on POS terminal 130 may detect the presence of security token 120 via NFC reader 136, transmit its own identifying information to security token 120, and receive transaction information from security token 120.

The details of this information exchange are further described with reference to FIGS. 3 and 7. Briefly, logic 125 may be further programmed with a plurality of restrictions on the transaction. The restrictions may be provisioned by mobile device 100 along with the transaction information while security token 120 was coupled to mobile device 100. Mobile device 100 may further communicate the restrictions to server 142 via network 140. When security token 120 is swiped or brought within a proximity of POS terminal 130, logic 125 verifies an identity of POS terminal 130, and provides transaction information to authorized terminals (with the authorization potentially being programmed into security token 120 when it was still coupled to mobile device 100, or by any other means known to one skilled in the art in light of this disclosure). A successful authorization may lead to POS terminal 130 receiving transaction information, and verifying this information with server 142 via network 140. If no restrictions are imposed, and if the transaction information is verified, server 142 may confirm the transaction with POS terminal 130, and POS terminal 130 in turn may program security token 120 with a confirmation. The confirmation may include a receipt, a transaction report, and other details about the transaction. Security token 120 may now disable itself, until it is returned to the user and re-coupled to mobile device 100, at which point it may communicate the confirmation to mobile device 100 to be displayed to the user. The confirmation may further be uploaded to a server, such as a payment or account server associated with the user's account.

Alternatively, at any point after being decoupled, logic 125 onboard security token 120 may determine that a transaction is restricted. For instance, a timeout onboard security token 120 is exceeded, or security token 120 is swiped at an unauthorized POS terminal. In these cases, logic 125 onboard security token 120 may deactivate any transacting ability until security token 120 is re-coupled to mobile device 100. In alternate example embodiments, mobile device 100 detects that a transaction is restricted, and remotely deactivates the transacting ability of security token 120. Further, certain conditions may trigger restrictions that lead to logic 125 erasing any transaction information from the memory on security token 120. Restrictions may be tiered, i.e., some restrictions may simply deny a transaction, while other restrictions trigger more drastic security measures. For instance, being swiped at an unauthorized POS terminal may simply cause logic 125 to withhold access, retrieval, or delivery of transaction information until an authorized POS terminal is detected, while transporting security token 120 outside of a certain vicinity (such as a geo-fence) may cause logic 125 to erase all sensitive information and deactivate the security token until it is re-coupled. Finally, when security token is re-coupled to mobile device 100, it provides a transaction report, as well as any details of its communication with POS terminal 130. The transaction report may further include a list of items purchased, prices, any restrictions triggered, POS terminal ID, etc.

There are numerous types of restrictions on the transaction that may be provisioned on security token 120. A funds limit or payment amount may be provided to limit purchases to a dollar amount. A time limit or timeout may instruct logic 125 to disable transactions after the user-defined limit has passed or the period has lapsed. A list of approved vendors may be provided, with corresponding approved POS identifiers being stored on a memory of the security token 120. Further, a list of approved products or categories of product may be provided, such that the user is not charged for items she did not intend on buying. Conversely, a list of restricted POS identifiers, products, or categories may be provisioned to indicate to the logic 125 to never transact with the restricted vendors/items. This would be especially useful for a user providing their security token to another party for their use. For instance, an employer provides a security token to an employee/agent to be used as a charge card for business-related expenses, and authorizes POS terminals from specific vendors to debit the charge card. At home, a father may provide his daughter with a security token to use for an evening. Before handing the token over, the father may use his mobile device to program restrictions such as a dollar amount, as well as a category "alcohol." In this way, the security token would not work for any purchases over the dollar amount, or for any purchases of alcoholic beverages. As can be envisioned, many other examples are also possible and within the purview and scope of the present disclosure.

POS terminals could generate bills including an item list, description, or "tags" for items and submit them to the server for verification against the restrictions received at the server from the mobile device. Keyword limitations may be included to limit purchases based on a name or description generated at the POS terminal. For security tokens enabled with location-based features (such as GPS receivers), location-based limits may also be provisioned. The user may further provision a temporary PIN or password on the security token, and instruct the vendor or operator of the POS terminal to input the code at the POS terminal along with swiping the security token. This ensures that an unauthorized entity who does not know the code is unable to use the security token. The POS terminal may contact the mobile device over a terrestrial or local-area network for permission of the user, an acknowledgement by the user, or entry of a PIN code, before proceeding with the transaction. Further, each restriction may be prescribed its own action, such as to simply deny a transaction or to shut down the security token altogether. Combinations of these limitations and their associated actions are possible, along with other restrictions that would become apparent to those of ordinary skill in the art in light of this disclosure.

In other example embodiments, neither the mobile device nor the POS terminal would have to access a network server to communicate or enforce restrictions. The logic for verifying restrictions may be distributed between the security token and the POS terminal. Alternatively, the POS terminal may communicate with the mobile device across a local area network (LAN) and provide transaction confirmations locally. In other embodiments, the mobile device provisions restrictions directly to the network server. In such a scenario, the POS terminal could receive transaction information from the security token, and transmit a list of purchased items and descriptions to the server, and the server would determine whether or not to approve the transaction. Alternatively, combinations of restrictions may be programmed onto both the security token and the server for a more dynamic transaction mechanism. Other configurations of the distribution of the logic will become readily recognizable to those having skill in the art upon considering this disclosure.

Figure 2:
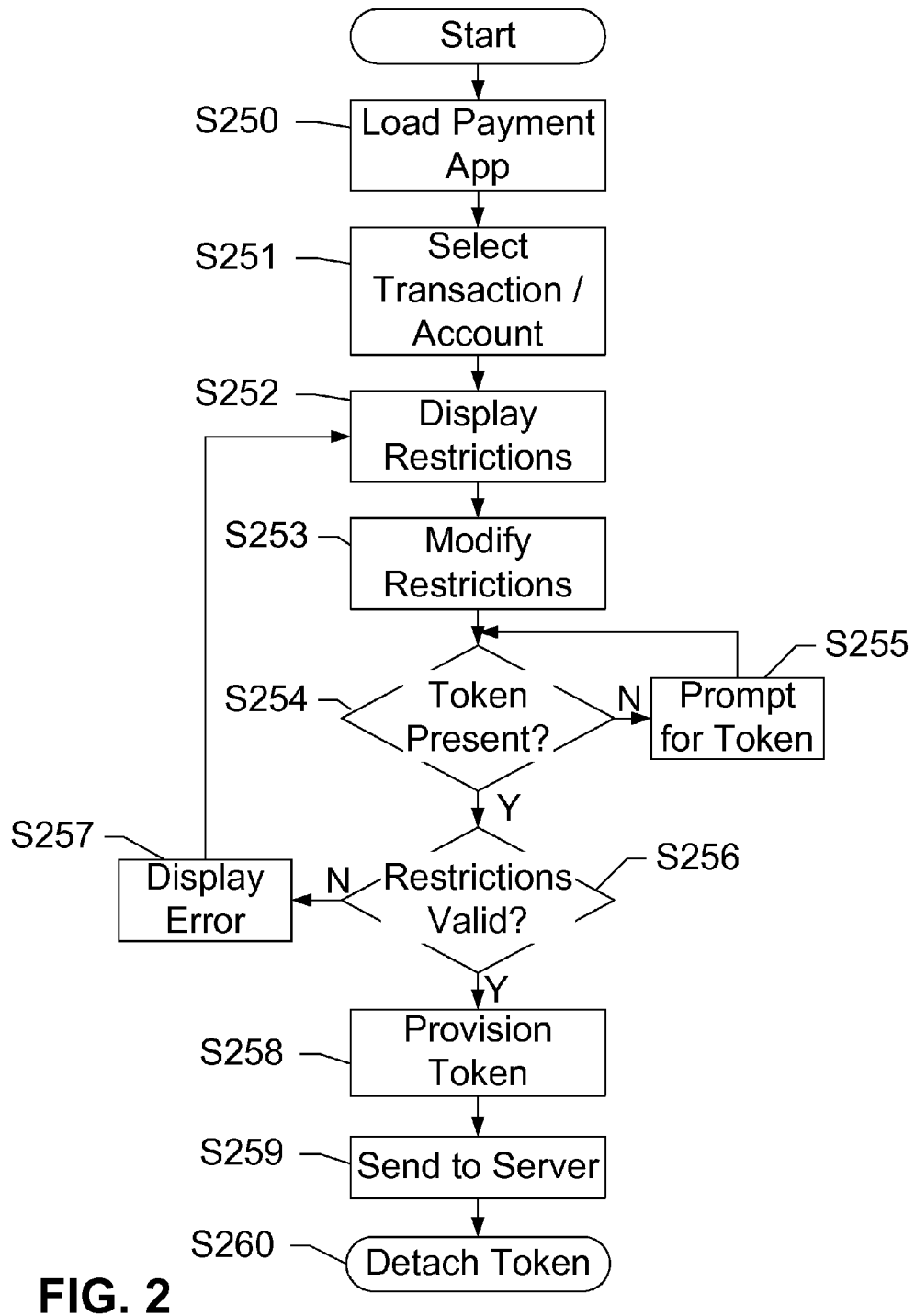
FIG. 2 shows a method for provisioning a security token, according to an example embodiment of the subject disclosure.

FIG. 2 shows a method for provisioning a security token, according to an example embodiment of the subject disclosure. The method may begin with a user's decision to perform a transaction. The user may launch the payment application S250 on the mobile device. The user may then select a transaction type S251. This could be any one of the transactions disclosed herein, such as, for example, a security authentication, purchase, banking transaction at a teller or ATM, etc. Depending on the transaction type, the user may select an account S251. The account may be a checking account, credit card account, etc. Depending on the user's selection, the payment application may display the current or default restrictions S252. These restrictions may include a dollar amount in the account, a daily limit, or other default restrictions. These may also include previous user-defined restrictions. Among the displayed restrictions may be the other restrictions described herein, such as time limits for the transaction to occur, location-based restrictions, vendor/product information, etc. The user may also be presented with an option to modify the restrictions S253 as described herein. At some point during the process, such as after the user elects to store the new restrictions, or even at the beginning of the method, the payment application may check the mobile hardware for the presence of the security token S254. For instance, the mobile device may be equipped with a switch that is depressed as the security token is coupled, and lifted as the security token is decoupled. Since the security token may need to be coupled for the information to be programmed onto it, a prompt for the token S255 may be presented when needed, and the payment application may wait for the token to be plugged in. Alternatively, any electrical communication with the security token may be detected, with the mobile device programming the security token electronically instead of using NFC. The application may also determine whether or not the restrictions are valid S256. This may include ensuring that the amount limits do not exceed the available balance, that there are no conflicts among restrictions, and that there are no other flaws in the restrictions defined by the user. If any issues arise, an error message may be displayed S257, and the system may revert back to the default (or last programmed) restrictions. If the restrictions are valid S256, then the application may provision the security token S258 with the transaction information (including the payment information), and any restrictions that need to be provisioned. The provisioning may occur via any number of methods, i.e., via an NFC reader onboard the mobile device to program the NFC chip within the security token. Alternatively, the memory of the security token may be programmed via an interface such as USB, serial, or any proprietary or commonly-used interface or electrical contact interface depending on the make and model of the mobile device. Further, restrictions may also be communicated S259 to a server across a network, in the case that the vendor's system communicates with the server to verify the transaction. This communication S259 may occur via any wireless connection between the mobile device and the Internet, such as cellular, wireless broadband, Wi-Fi, LAN, femtocell, etc. Once the restrictions are provisioned S258, and communicated to the server S259, the security token may be decoupled S260. The mobile device at this point simply waits for the token to return.

Figure 3:
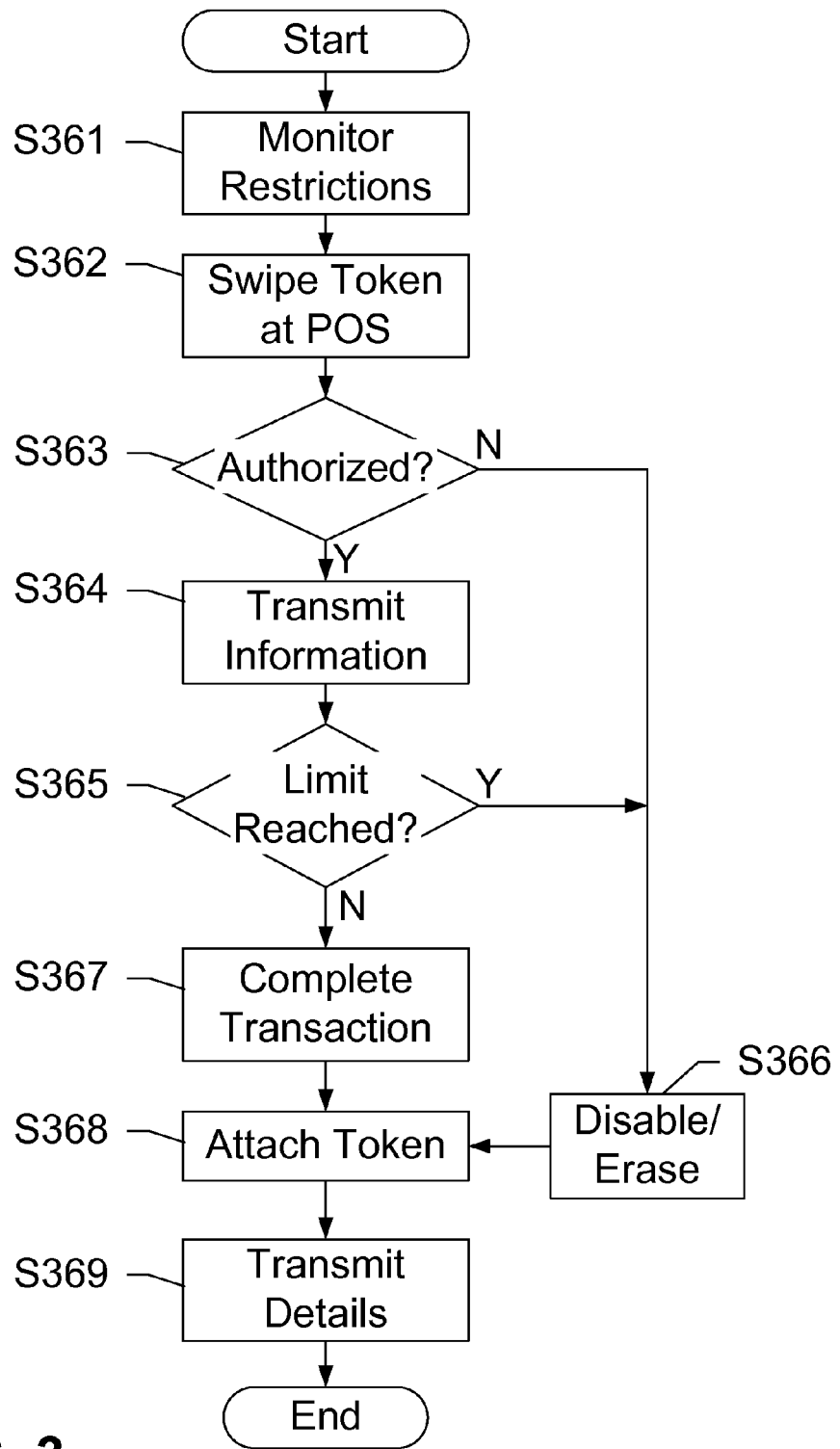
FIG. 3 shows a method for performing NFC transactions, according to an example embodiment of the subject disclosure.

FIG. 3 continues the method for performing NFC transactions from the point of view of the security token, according to an example embodiment of the subject disclosure. The method may start with a security token that has been programmed, decoupled, and is being transported over to an NFC reader for payment/authentication. Throughout its activated time, the security token may monitor for any violation of a restriction S361. For instance, an internal clock may monitor for a timeout starting from when the token was decoupled. A security token with GPS and a power supply may be able to constantly monitor its location. For security tokens without power supplies, the restrictions may be acted upon at the time the security token is swiped S362 at an NFC reader using inductive power as further described below. When the security token is swiped S362, it may determine whether or not the transaction, the POS terminal, the vendor, the product being purchase, the price, or any combination of these restrictions, may be being violated S363. If any of these restrictions is violated, the method may disable the security token S366 and/or erase sensitive information, depending on the user's preference upon provisioning. If the POS terminal and the transaction are authorized S363 by the restriction list on the security token, then the security token may transmit the transaction information stored within it to the NFC reader S364. This may occur as a response to an NFC query from the POS terminal. In one example embodiment, only information necessary to performing the transaction may be transmitted, such as account information, and an amount. Alternatively, the restrictions may also be transmitted to the NFC reader, which then uses them to verify the transaction. For instance, a spending limit is compared to the transaction amount S365. This may also occur by communicating with a server across a network to verify the transaction. In either case, the results of the verification may be communicated to the security token S365. If the limit is reached, or if any other restriction is determined to be present, the method may disable and/or erase the transaction information S366 from the security token, at least until the token is re-coupled S368. If no limits have been reached, then the transaction may be determined to be successfully complete S367. Step S367 may also include receiving a confirmation of the transaction from the NFC reader at the POS terminal. When the security token is re-coupled to the mobile device S368, it may communicate with logic onboard the mobile device and transmit S369 any details about the transaction, including, but not limited to, a confirmation of a successful transaction, or any errors.

While the security token is decoupled, the mobile device may broadcast a continuous signal or beacon, and receive updates from the security token. This could use a minimal data transfer. For instance, the security token may transmit back to the mobile device a series of text-based codes, indicating its status. Any codes out of the ordinary could indicate an error, and could be used to alert the user that the security token may be compromised, or a restriction has been triggered. This may enable the user to take remedial actions via the mobile device, or by alerting the vendor. It is conceivable that the security token itself may have a cellular transceiver incorporated within it. This alternative may add several additional features for communicating between the mobile device and the security token, as well as between the security token and a network, such as network 140. The security token may communicate its status to the mobile device via a private network, a public network such as the Internet, a cloud network, or any combination thereof. A user could remotely "brick" or disable the security token by sending a command to the network via her mobile device or laptop. Further, restrictions may be updated dynamically in real time while the security token is decoupled. All these are also possible with security tokens enabled with other types of transceivers that can communicate across local area networks.

As described above, communication between the security token and the mobile device may be wired or wireless. In the case of wired communication, detection of the presence of the security token may be determined via electrical communication with the security token, and/or communication with one or more components of the security token as it is "plugged in" to be detected by the mobile application. The security token may be activated (ready to perform a transaction, in other words) when it is unplugged from the mobile device. In the case of wireless communication, an NFC reader onboard the mobile device may sense the proximity of the security token. In some example embodiments, an optional mechanical switch may additionally or alternatively be utilized to indicate to the mobile logic whether the security token is coupled or not. Several combinations of wired and wireless security tokens having NFC chips, power supplies, and other features are possible. FIGS. 4A-4D show various configurations of security tokens, according to various example embodiments of the subject disclosure.

Figure 4A:
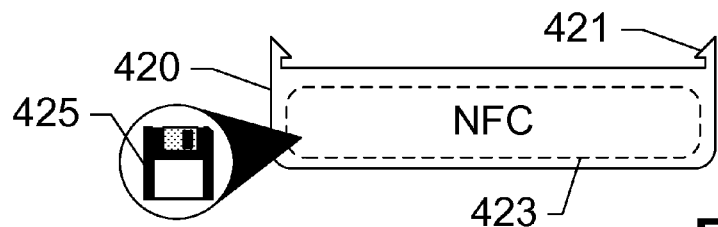
FIGS. 4A-4D show various configurations of security tokens, according to example embodiments of the subject disclosure.

FIG. 4A shows a security token 420 containing an NFC chip 423. As described earlier, NFC chip 423 may include a transceiver, a controller, and a memory to store logic 425 along with the transaction information and other information such as payment information. Security token 420 may be adapted to fit against, adjacent to, or within, at least in part, a casing or housing of a mobile device and couple to the casing via a coupling mechanism such as clip 421. In one example embodiment, clip 421 may be designed to depress a mechanical switch of the mobile device when security token 420 is coupled to the mobile device. The mechanical switch may indicate to logic on the mobile device whether or not the security token 420 is coupled. When coupled, logic on the mobile device may use an NFC reader on the mobile device to wirelessly provision NFC chip 423 with transaction and other information. When security token 420 is decoupled and swiped at an NFC reader of a POS terminal, it may communicate with the POS terminal as described herein. In particular, since security token 420 may not include a power supply, it may receive its power from the RF or magnetic/inductive field generated by the NFC reader at the POS terminal. Using this power, the controller, via logic 425, may authenticate the POS terminal by comparing an identifier of the POS terminal against a list of authorized POS terminals, or POS terminals registered to a particular authorized entity, the list being stored on the memory of NFC chip 423. In alternative example embodiments, a blacklist of unauthorized entities/POS terminals may be stored in the memory, with logic 425 authenticating a transmitting POS terminal that is not on the blacklist. Logic 425 may determine if the transaction is restricted, i.e., by checking an onboard clock, applying a maximum spending limit, etc., and may determine whether or not to transmit the transaction information. Further, logic 425 may decline payment or erase sensitive data upon determining that the transaction is restricted.

Figure 4B:
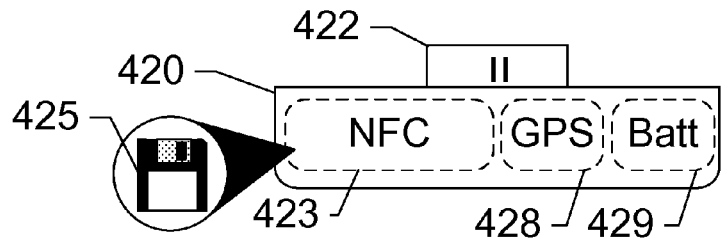

FIG. 4B shows a security token 420 having a data interface 422. Data interface 422 may be designed to be inserted into a data port of a mobile device, with security token 420 sitting against or adjacent a casing of the mobile device. The electrical coupling provided by data interface 422 may additionally eliminate the requirement for a mechanical switch as described with respect to FIG. 4A. In such a case, the mobile device may simply include logic to determine whether or not the data interface 422 is plugged into the data port of the mobile device. When plugged in, logic on the mobile device may use either an NFC reader to wirelessly provision NFC chip 423 with transaction and other information, or may use data interface 422. Data interface 422 may be any proprietary or open known or future interface, including universal serial bus (USB), equivalents, and variants thereof. Further, in this embodiment, security token 420 may include a GPS receiver 428 and/or a battery 429. Consequently, logic 425 may not need to wait to receive its power from an RF or magnetic/inductive field generated by an NFC reader at a POS terminal. Instead, restrictions may be monitored from the time security token 420 is decoupled, until the time it is performing the transaction with the POS terminal. Logic 425 may determine if the transaction is restricted, e.g., by checking the POS terminal identifier for authorization, by checking an onboard clock for a timeout, applying a maximum spending limit, etc., and whether or not to transmit the transaction information. Further, a location fix derived from GPS receiver 428 my enable logic 425 to determine whether any location-based restriction has been triggered or not. Logic 425 may then decline payment or erase sensitive data upon determining that a restriction is triggered, or transmit transaction information if no restriction is triggered. Moreover, the battery may be charged via data interface 422 as needed.

Figure 4C:
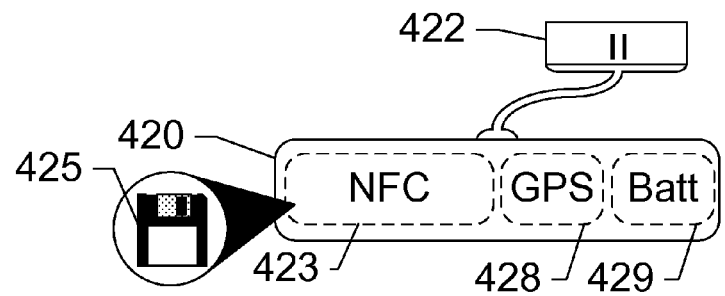

FIG. 4C is substantially similar to the embodiment of FIG. 4B, except that data interface 422 may be coupled to security token 420 via a cable, instead of being integrated with a casing of security token 420. This allows security token 420 to have a casing that does not have to fit against a casing of a mobile device. Therefore, this exemplary security token 420 may be coupled to many mobile devices of different makes and models, so long as the mobile device includes a data port adapted to receive data interface 422. As described before, data interface 422 may be any known or future interface including USB, etc. The mobile device may further provision NFC chip 423 wirelessly, or via its data interface.

Figure 4D:
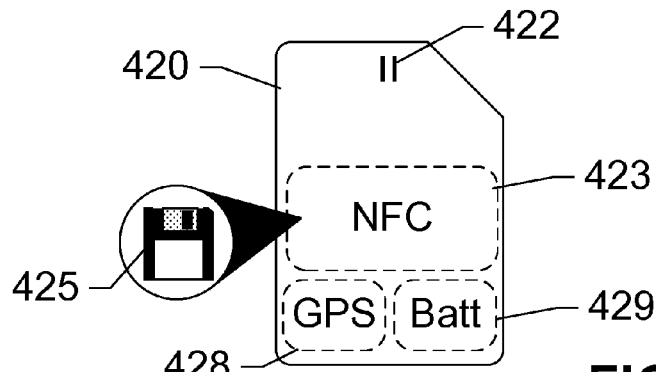

FIG. 4D shows a security token in the form of a smart card 420. Smart card 420 may be designed as, for example, a subscriber identity module (SIM), Universal SIM, UICC, or as a memory card, such as a secure-digital (SD) card. Smart card 420 may therefore be able to be inserted into any available smart-card slot or port on a mobile device, with communication occurring via electrical leads 422. Alternatively, communication may still occur via NFC chip 423. The functions of logic 425, GPS 428, and battery 429 may be substantially similar to the embodiments of FIGS. 4A-4C.

Although specific features have been shown in the different example secure tokens of FIGS. 4A-4D in specific physical configurations and/or combinations, it should be noted that any configuration and/or combination of these features may be included in any of the disclosed physical forms. Further, it is conceivable that other physical forms and combinations of features are possible, and potentially apparent to one having ordinary skill in the art in light of this disclosure, while maintaining the novelty of the features disclosed herein. For instance, a battery-powered security token may be provided without any data interfaces. In such a situation, it can be conceived that the battery charges itself via induction from the power supply of the mobile device. A timeout may be refreshed via a separate NFC reader. For example, a decoupled security token may be used to authenticate a user to enter a particular building. The user is unsure how long his business will take in the building, so he may regularly swipe the security token at NFC readers provided by the owner/operator of the building. This ensures that the user remains authenticated, and is also used to maintain a charge on a battery of the security token via induction. Generally, any adaptation to the secure token to fit the tremendous variety of mobile devices and NFC readers on the market today and in the future is well within the scope of the subject disclosure, with the disclosed embodiments being merely representative of the potential diversity of possibilities. Certain embodiments of the security token remain in communication with the mobile device while decoupled. This may require additional hardware components, including transceivers, batteries, etc. These embodiments may be particularly useful for high-security applications such as keys to restricted access areas, vaults, deposit boxes, etc. Stronger transceivers may utilize different communication technologies such as WiFi, BLUETOOTH, WiMAX, LTE, Zigbee, other IEEE 802.XX protocols, etc., which will be readily recognizable by those having skill in the art upon reading this disclosure.

Figures 5A, 5B:
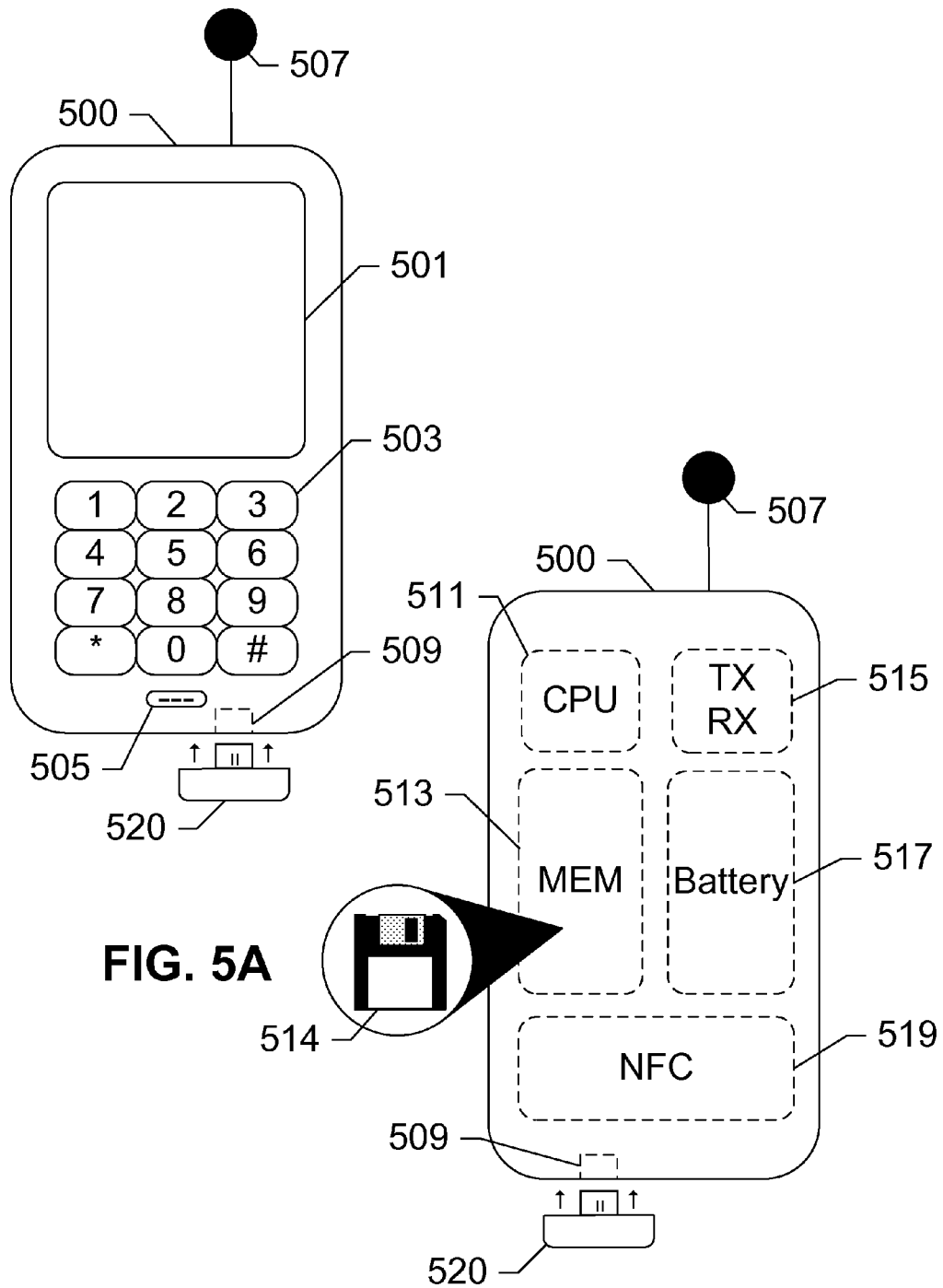
FIGS. 5A-5B respectively show external and internal components of a mobile device, according to an example embodiment of the subject disclosure.

FIGS. 5A-5B show external and internal components, respectively, of a mobile device, according to an example embodiment of the subject disclosure. The mobile device generally refers to any electronic device capable of wirelessly sending and receiving data, such as cellular telephones, smart phones, personal digital assistants (PDAs), portable computers, etc. With reference to FIG. 5A, mobile device 500 may include a display 501, a keypad 503, a microphone 505, an antenna 507, and a port 509. Display 501 may be a liquid crystal display (LCD) that serves as a visual output for the user. Display 501 may be used to display a user interface for an operating system, as well as notifications of service offers and service changes. Keypad 503 may be used as an input for entering information and commands to mobile device 500. Microphone 505 may accept aural input and allows mobile device 500 to deliver voice communication to the network and other mobile devices. Antenna 507 may be a transducer for transmitting and receiving wireless radio frequency (RF) signals to and from wireless networks, network nodes, and other wireless devices.

With reference to FIG. 5B, inner components of mobile device 500 may include one or more of a processor 511, one or more of a memory 513 storing a logic 514 along with additional logic, a transceiver 515, a battery 517, an NFC reader 519, and port 509. Processor 511 may receive input and may issue commands to deliver output through the other components. Examples of processors are computer processors (processing units), microprocessors, digital signal processors, controllers and microcontrollers, etc. Memory 513 may store information including logic 514 for enabling processor 511 to operate the other components of mobile device 500. Examples of memories include, but are not limited to, RAM (random access memory), flash memories, ROMS (read-only memories), EPROMS (erasable programmable read-only memories), EEPROMS (electrically erasable programmable read-only memories), or any other storage device or medium. Transceiver 515 may convert wireless signals received by antenna 507 to information capable of processing by processor 511, and vice-versa, and to communicate with a network and other mobile devices. Battery 517 may power mobile device 500, and may be rechargeable via an external power source. Logic 514 may further include a payment application that uses NFC reader 519 to read from and transfer information to a security token 520, as described herein. Port 509 may be adapted to receive security token 520. In some example embodiments, port 509 may be a data port, and may be employed by logic 514 to program security token 520. In other example embodiments, port 509 may not be electrically coupled to anything, except including a mechanical switch that may be depressed when security token 520 is inserted into it. In either case, port 509 may enable the mobile device to determine whether or not security token 520 is inserted.

There are many embodiments of a mobile device that are capable of being used in accordance with the subject disclosure. In other embodiments of the mobile device, other displays may be used, such as an LED display, OLED display, etc. In some embodiments, the display may be used as a touch-sensitive input device, i.e., a touch screen. A touch screen may allow the user to view output on the display as well as use the display to provide input. In some touch screen embodiments the mobile device may not have a physical keypad for input. Instead, a virtual keypad may be displayed on the touch screen and the user inputs information or requests by touching the virtual keys. Other forms of input such as full keyboards, accelerometers, motion sensors, etc., may be utilized in the mobile device. The memory may be a non-removable internal memory, or a removable memory coupled to a SIM card or a memory card inserted into a memory card reader. Many mobile devices have more than one transceiver or a transceiver that supports more than one protocol. For instance, it is not uncommon for a mobile device to support cellular radio frequency (RF), GSM, GPRS, UMTS, W-CDMA, LTE, NFC, WiFi, BLUETOOTH®, ZIG-BEE®, and Z-WAVE® protocols. A mobile device involving multiple modes of wireless communications, such as cellular, WiFi, NFC, etc., may contain a plurality of antennas on a single device. For example, an NFC-enabled mobile device may have separate antennas for cellular and NFC communications, respectively.

Figure 6A:
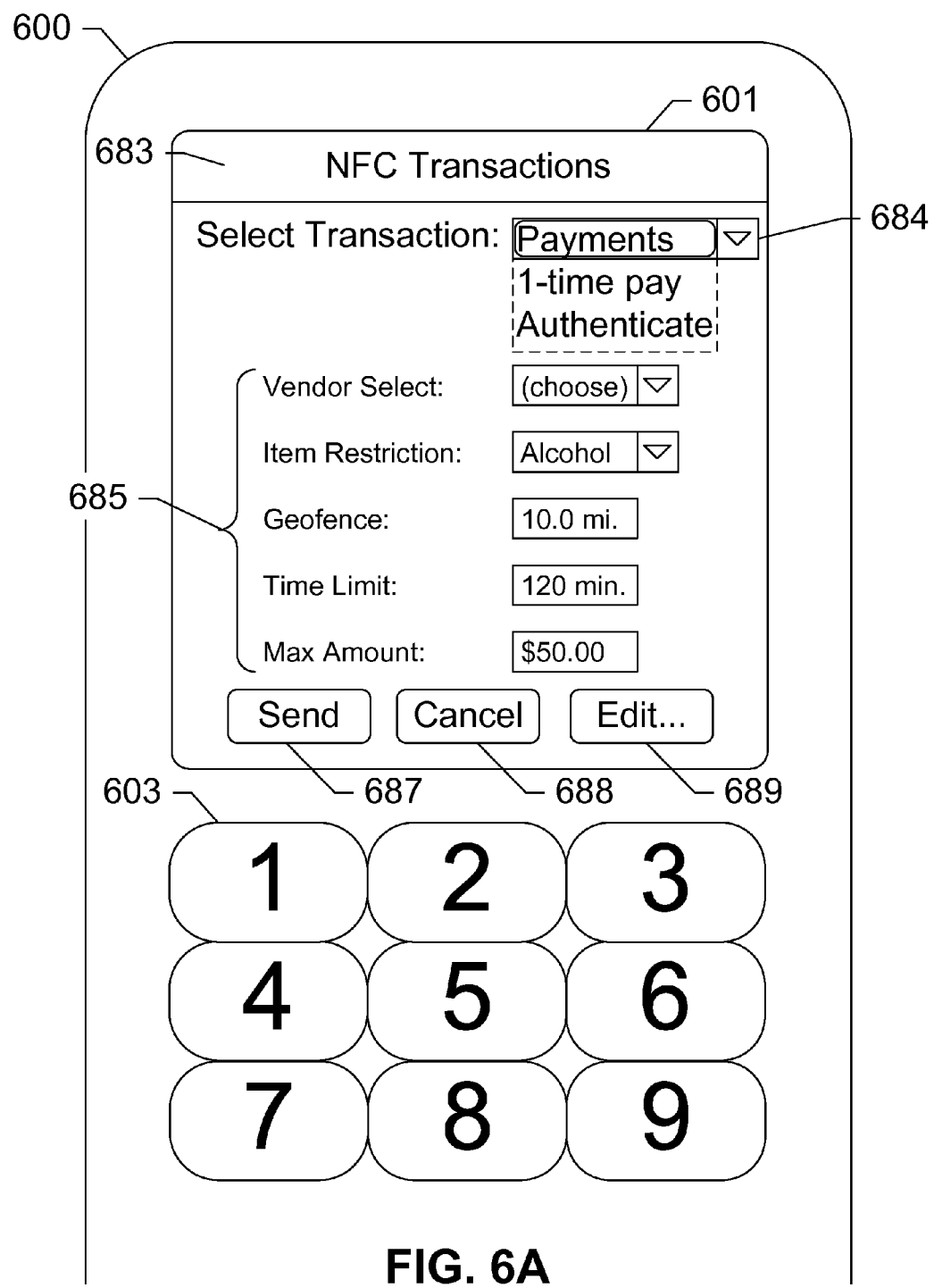
FIGS. 6A-6B show screenshots of an NFC transaction application on a mobile device, according to an example embodiment of the subject disclosure.
Figure 6B:
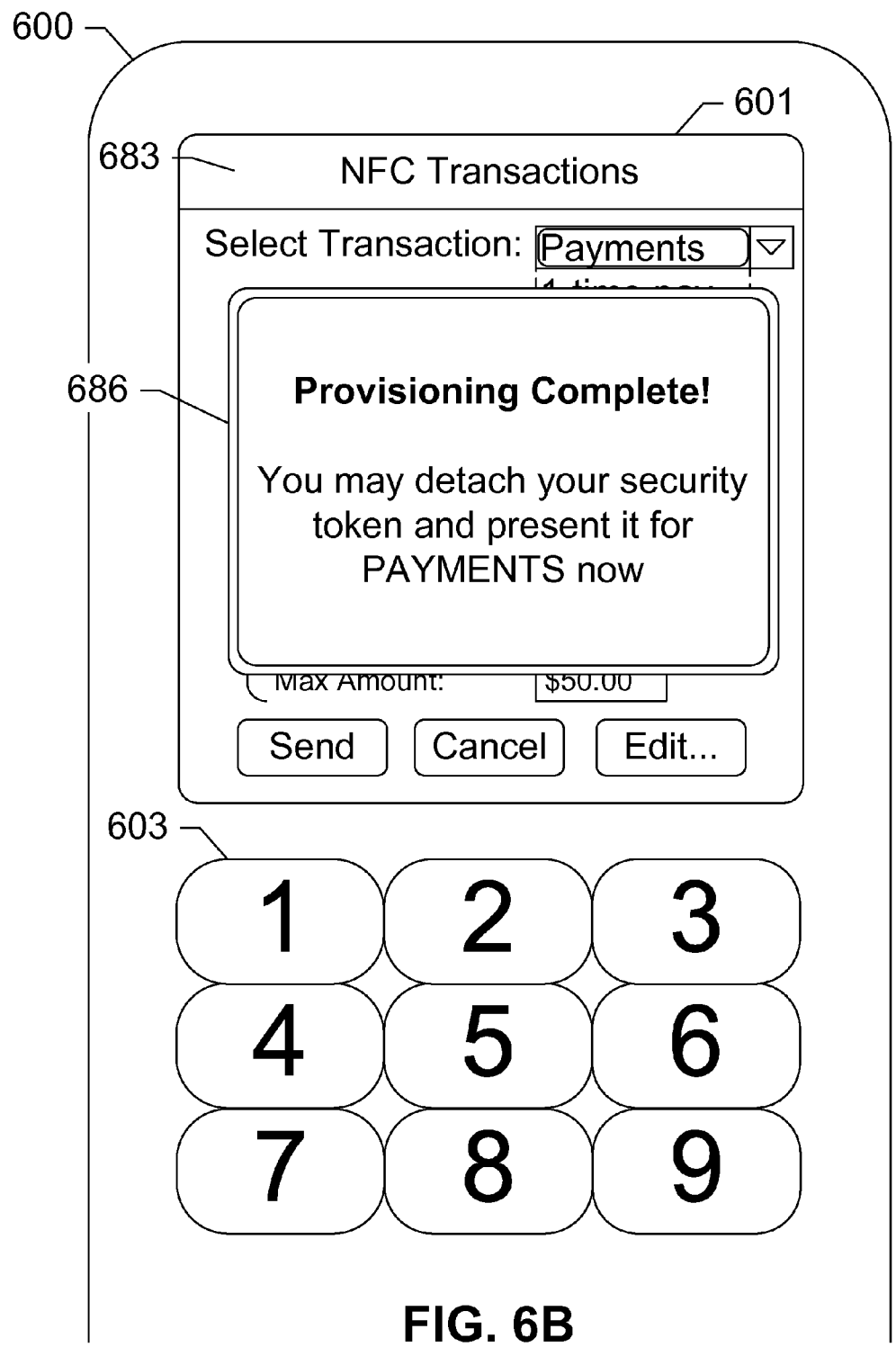

FIGS. 6A-6B show screenshots of an NFC transaction application on a mobile device 600, according to an example embodiment of the subject disclosure. The application 683 may be viewed on a display 601 of mobile device 600. The application 683 may display a choice for the type of transaction 684 that the user wishes to perform. Examples of choices may include, for example, multiple payments, a one-time payment, or a basic authentication. Depending on the user's choice, a list of restrictions 685 may be displayed, with options to modify restrictions 685. For multiple payments, restrictions 685 may include, not limited to, a selection of a vendor, an item restriction, a geofence, a time limit, and a maximum amount. After setting restrictions 685, a user may activate the "send" button 687 to transmit the transaction information and restrictions 685 to the security token, the "cancel" button 688 to cancel the process, and the "edit" button 689 to add, remove, or modify vendors, categories, items, etc. Buttons 687, 688, and 689 may be activated by manipulating the keys of keypad 603, or any other input that may be available such as touch screen technology, accelerometer input, etc.

In an example embodiment, a father is programming the security token to give to his daughter for the evening. Consequently, he allows her multiple payments, with no vendor restrictions, a category restriction including the category "alcohol," a location-based restriction or geofence of 10 miles, a two-hour time limit, and a budget of $50. If any of these restrictions is triggered, then the transaction could be denied, the transaction information may be erased, and the father becomes aware of the triggered restriction, for example, when he re-couples the security token to mobile device 600. With reference to FIG. 6B, the user has pushed the "send" button 687, and receives a confirmation message 686 that the provisioning is complete, and the security token is ready for use. Similar selections are provided to an employer providing a security token to an employee/agent to be used as a charge card for business-related expenses. The employer may identify particular vendors or POS terminals from specific vendors as authorized, and sets a budget for the purchases made by the employee.

Figure 7:
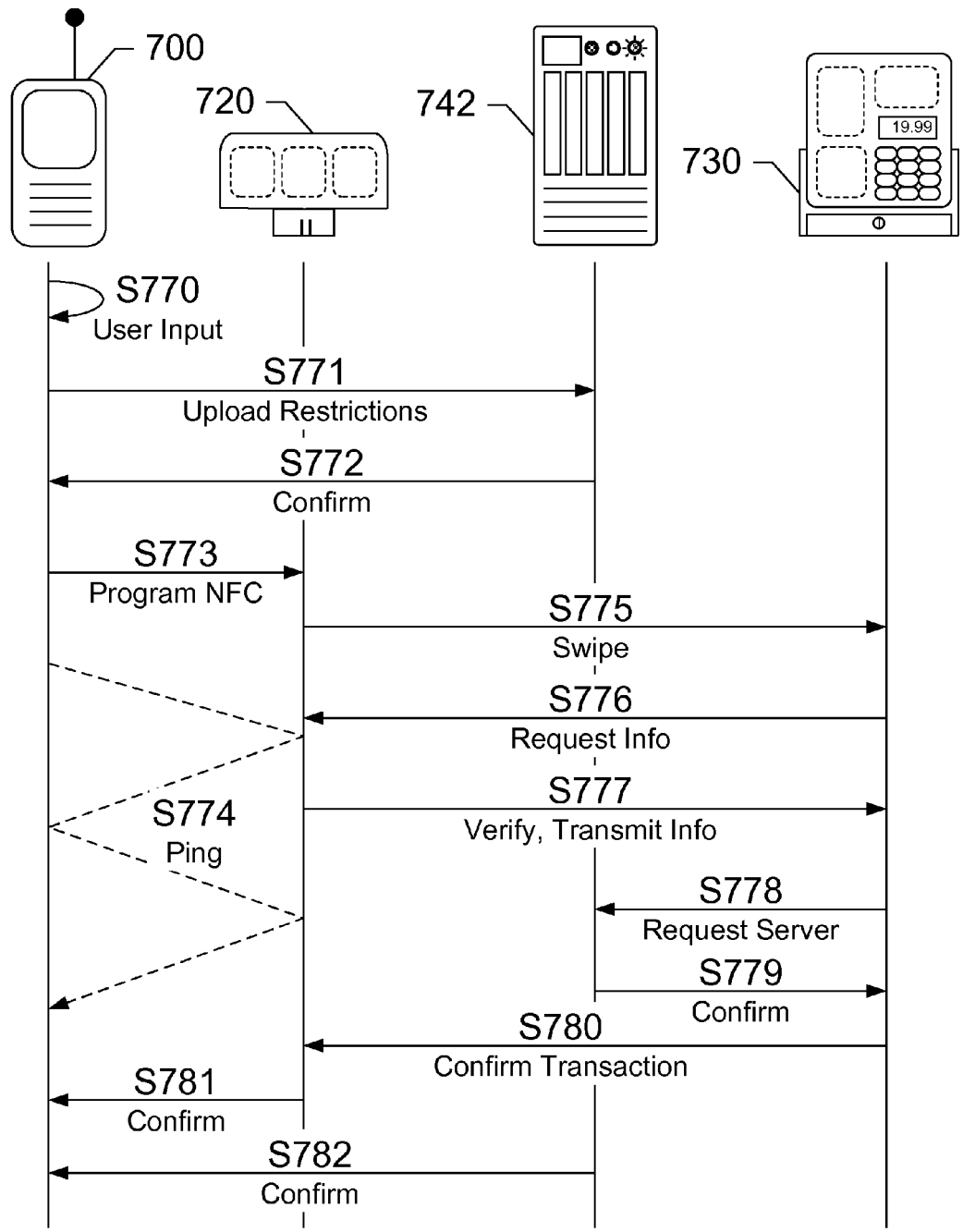
FIG. 7 shows a process flow diagram of an NFC transaction, according to an example embodiment of the subject disclosure.

FIG. 7 shows a process flow diagram of an NFC transaction, according to an example embodiment of the subject disclosure. The entities in this process may include a mobile device 700, a security token 720, a server 742, and a POS terminal 730. The process may begin with a user's decision to perform a transaction. The user may provide input S770 sufficient to launch a payment application on mobile device 700, select a transaction type, an account, and select user-defined restrictions. The application may determine whether or not the restrictions are valid by uploading them S771 to server 742 and receiving a confirmation S772. The server 742 may validate the transaction based on one or more factors, such as comparing a current balance to an amount restriction, or by identifying malicious or unauthorized vendors/POS terminals. A geofence and/or a timeout may additionally be enforced by server 742, which may communicate its results back to the application. This communication may occur via any wireless connection between the mobile device 700 and server 742, such as cellular, wireless broadband, Wi-Fi, LAN, femtocell, etc. The confirmation S772 may verify that funds are available, and that the transaction is not limited by some other factors. If the restrictions are valid, then the application may provision the security token 720 with the transaction information (including the payment information), and any restrictions that need to be provisioned S773. The provisioning S773 may occur via any number of methods, for instance by using an NFC reader onboard mobile device 700 to program the NFC chip within the security token 720. Alternatively, the memory of the security token 720 may be programmed via an interface, such as, for example, USB, or any proprietary or commonly-used interface depending on the make and model of the mobile device. Once the restrictions are provisioned S773, security token 720 may be decoupled and swiped S775 at POS terminal 730. While security token 720 is decoupled, mobile device 700 may broadcast a continuous signal or beacon S774, and receive updates from security token 720. The beacon S774 may be used in some example embodiments and may not be used in all cases. This uses minimal data transfer. For instance, security token 720 may invoke its NFC, Wi-Fi, BLUETOOTH, or cellular transceiver to transmit back to mobile device 700 a series of text-based codes, indicating its status. If any codes indicate an error, the user may be informed that security token 720 may be compromised, or a restriction has been triggered. This enables the user to take remedial actions via mobile device 700, or by alerting the vendor.

Meanwhile, upon swiping S775 security token 720, POS terminal 730 may provide a bill and may request transaction information (including payment information) S776 from security token 720. Security token 720 may determine that neither the transaction, the POS terminal, the vendor, the product being purchase, the price, or any combination of these restrictions, is being violated, and may further transmit transaction information S777 to POS terminal 730. If any of these restrictions had been violated, logic aboard security token 720 could erase the information, disable the token, and transmit a response signal, such as a distress signal or an error code, in response to the continuous signal or beacon S774 transmitted from mobile device 700. However, given that none of the restrictions are violated, this "self-destruct" does not happen, and security token 720 may transmit the transaction information S777 to POS terminal 730. POS terminal 730 may verify payment S778 with server 742. This step may include server 742 checking for violation of any additional restrictions (such as the ones received at server 742 in step S771). Server 742 may also double-check to see if funds are available for the transaction. If all is well, server 742 may provide a confirmation S779 that the transaction is successful. POS terminal 730 may then provide a confirmation S780 to security token 720, which may at this point disable itself so that no further transactions may be requested, depending on the restrictions. Further, upon being re-coupled to mobile device 700, security token 720 may provide a confirmation S781 to the user, including a report of any details related to the transaction. Finally, server 742 may also communicate a transaction confirmation S782 to mobile device 700. The additional confirmation S782 may provide a redundant confirmation that may arrive at mobile device 700 before security token 720 is returned, providing the user with more peace of mind.

Figure 8:
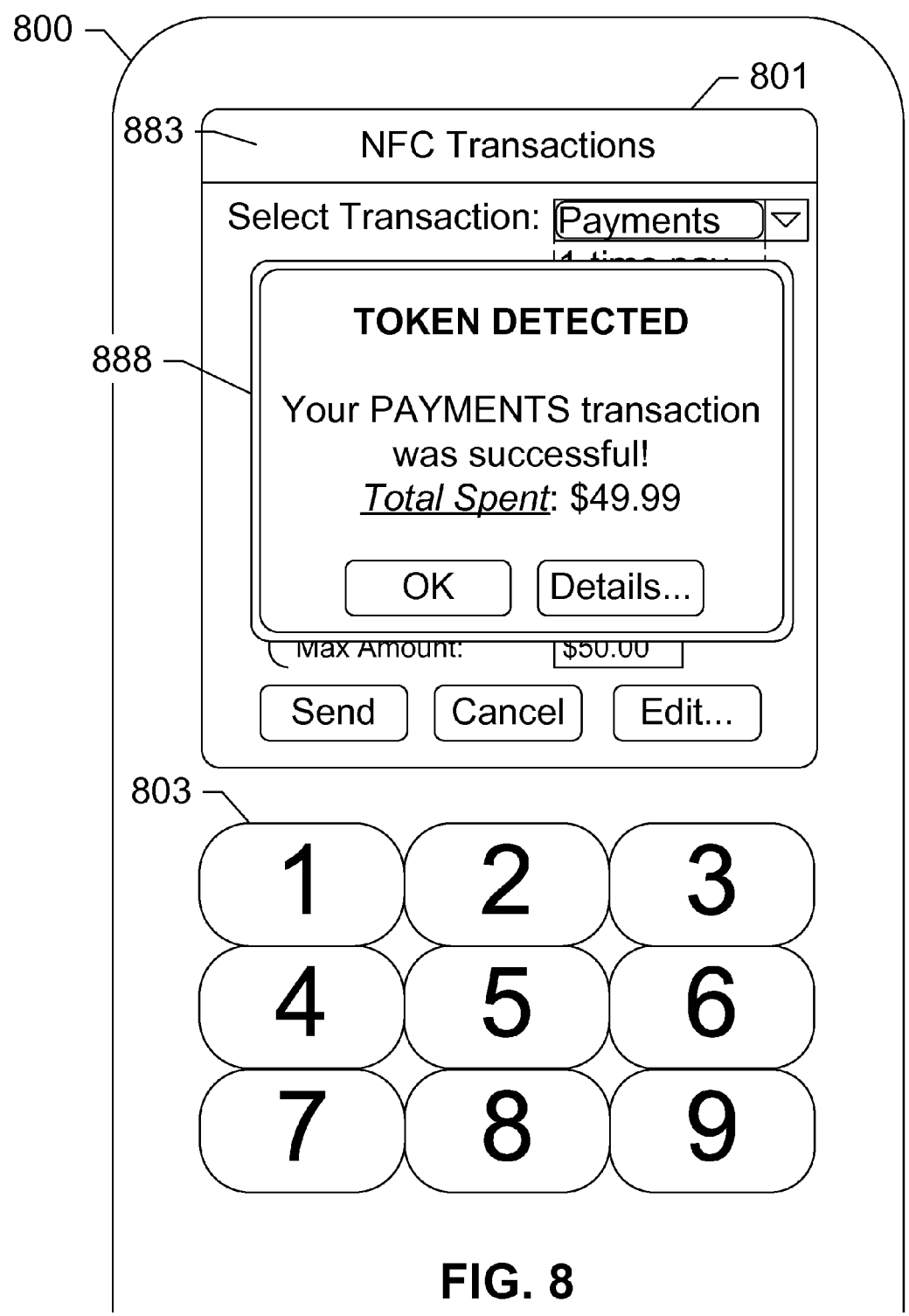
FIG. 8 shows a screenshot of a payment confirmation, according to an example embodiment of the subject disclosure.

FIG. 8 shows a screenshot of a payment confirmation 888, according to an example embodiment of the subject disclosure. Payment confirmation 888 may be displayed as soon as the security token is inserted into or coupled to mobile device 800. An NFC transactions application 883 may launch the confirmation 888, with a brief summary of the transaction, and an option to view more details. Viewing more details would provide any restrictions on the transaction, itemized bills, or any other information communicated from the POS terminal to the security token. In this example embodiment, the father can now rest easy knowing that his daughter spent less than the $50 limit, and no alcohol was purchased, at least from the security token. In addition, mobile device 800 may automatically wipe the memory of the security token after downloading the transaction details. This may reduce the chances of an inadvertent scan of the security token in the future, as well as ensuring that no future unauthorized use occurs. In other words, the security token may be re-provisioned before every new transaction.

The present subject disclosure may be incorporated in a mobile wallet service, such as that in U.S. patent application Ser. No. 11/727,493, filed Mar. 27, 2007, which is hereby incorporated by reference herein in its entirety into this disclosure. With mobile wallet services, technology is embedded into mobile devices that allow the user to pay for goods and services in a retail environment. Briefly, a mobile wallet is an application that helps facilitate transactions by storing a customer's credit card, debit card, bank account, and other financial information for use with electronic transactions. The mobile wallet includes payment instruments, debit/credit/gift card details, etc. When completing a transaction, the application is launched for card selection and security verification. A PIN may be required.

The foregoing disclosure of the example embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A mobile device comprising:
   a mobile processor;
   a security token in communication with the mobile processor via an interface, the security token comprising
      a near field communications transceiver,
      a token memory that stores transaction information and a token logic that, when executed by the security token, enables a point-of-sale terminal to access the transaction information based on a determination that no restriction is present, wherein the security token is removably coupled to a housing of the mobile device; and
   a mobile memory that stores instructions that, when executed by the mobile processor, causes the mobile processor to perform operations comprising programming the transaction information and the restriction on the security token, wherein the restriction comprises a point-of-sale identifier restriction that is programmed on the mobile memory by the mobile device.

2. The mobile device of claim 1, further comprising instructions that, when executed by the mobile processor, cause the mobile processor to erase the transaction information from the mobile memory if the restriction is present.

3. The mobile device of claim 1, further comprising instructions that, when executed by the mobile processor, cause the mobile processor to match a received point-of-sale identifier to an approved point-of-sale identifier.

4. The mobile device of claim 1, further comprising instructions that, when executed by the mobile processor, cause the mobile processor to deny payment to the point-of-sale terminal if the point-of-sale identifier is not approved.

5. The mobile device of claim 1, wherein the restriction further comprises a purchase restriction, and wherein the instructions further comprise instructions that, when executed by the mobile processor, cause the mobile processor to deny payment to the point-of-sale terminal if an item to be purchased matches the purchase restriction.

6. The mobile device of claim 1, further comprising a global positioning system receiver that enables a location-based restriction.

7. The mobile device in claim 1, further comprising;
   a data port that receives the security token; and
   instructions that, when executed by the mobile processor, causes the mobile processor to perform operations comprising programming the transaction information and the restriction on the security token via the data port.

8. The mobile device in claim 1, further comprising;
   a transceiver in communication with a network; and
   instructions that, when executed by the mobile processor, causes the mobile processor to perform operations comprising transmitting the restriction to a server on the network.

9. The mobile device in claim 1, further comprising instructions that, when executed by the mobile processor, causes the mobile processor to perform operations comprising transmitting a status inquiry, and receiving a response status from the security token.

10. The mobile device in claim 1, further comprising instructions that, when executed by the mobile processor, causes the mobile processor to perform operations comprising presenting a user interface enabling a user to input the restriction and the transaction information.

11. A mobile device comprising:
a housing;
an interface;
a mobile processor;
a security token in communication with the mobile processor via the interface, the security token comprising
a near field communications transceiver,
a token memory that stores transaction information and a token logic that, when executed, causes the security token to enable a point-of-sale terminal to access the transaction information based on a determination that no restriction is present, wherein the security token is removably coupled to a housing of the mobile device; and
a mobile memory that stores instructions that, when executed by the mobile processor, causes the mobile processor to perform operations comprising programming the transaction information and the restriction on the security token, wherein the restriction is programmed on the mobile memory by the mobile device, and wherein the restriction comprises a point-of-sale identifier restriction.

12. The mobile device of claim 11, further comprising:
a data port coupled to the interface to receive the security token; and
instructions that, when executed by the mobile processor, causes the mobile processor to perform operations comprising programming the transaction information and the restriction on the security token via the data port.

13. The mobile device of claim 11, further comprising:
a transceiver in communication with a network; and
instructions that, when executed by the mobile processor, causes the mobile processor to perform operations comprising transmitting the restriction to a server on the network.

14. The mobile device of claim 11, further comprising instructions that, when executed by the mobile processor, cause the mobile processor to perform operations further comprising transmitting a status inquiry, and receiving a response status from the security token.

15. The mobile device in claim 11, further comprising instructions that, when executed by the mobile processor, cause the mobile processor to perform operations further comprising presenting a user interface that enables inputting the restriction and the transaction information.

16. A mobile device comprising:
a mobile processor;
a security token in communication with the mobile processor via an interface, the security token comprising
a near field communications transceiver,
a token memory that stores transaction information and a token logic that, when executed by the security token, enables a point-of-sale terminal to access the transaction information based on a determination that no restriction is present, wherein the security token is removably coupled to a housing of the mobile device; and
a mobile memory that stores instructions that, when executed by the mobile processor, causes the mobile processor to program the transaction information and the restriction on the security token, wherein the restriction is programmed on the mobile memory by the mobile device, and wherein the restriction comprises a point-of-sale identifier restriction.

17. The mobile device of claim 16, further comprising instructions on the mobile memory that, when executed by the mobile processor, cause the mobile processor to perform operations comprising programming the transaction information and the restriction on the security token via the data port.

18. The mobile device of claim 16, further comprising instructions on the mobile memory that, when executed by the mobile processor, cause the mobile processor to perform operations comprising transmitting the restriction to a server on the network.

19. The mobile device of claim 16, further comprising instructions on the mobile memory that, when executed by the mobile processor, cause the mobile processor to perform operations comprising transmitting a status inquiry and receiving a response status from the security token.

20. The mobile device in claim 16, further comprising instructions on the mobile memory that, when executed by the mobile processor, cause the mobile processor to perform operations comprising presenting a user interface that enables inputting the restriction and the transaction information.

* * * * *